United States Patent [19]

Haas

[11] Patent Number: 5,104,744

[45] Date of Patent: Apr. 14, 1992

[54] SPACER FOR AN ESSENTIALLY CYLINDRICAL TOOL AND PROCESS FOR ITS PRODUCTION

[75] Inventor: Adolf Haas, Vienna, Austria

[73] Assignee: Garanturbo Maschinen und Werkzeuge Gesellschaft M.B.H., Vienna, Austria

[21] Appl. No.: 545,947

[22] Filed: Jul. 2, 1990

[30] Foreign Application Priority Data

Jul. 5, 1989 [AT] Austria .................. 1638/89

[51] Int. Cl.$^5$ ............................. B29D 30/68
[52] U.S. Cl. ..................... 428/596; 428/603; 83/664; 157/13
[58] Field of Search ........... 157/13; 83/664, 508.3, 83/951; 29/557, 558, 400.1, 412, 897; 428/596, 595, 603, 597

[56] References Cited

U.S. PATENT DOCUMENTS

| | | | |
|---|---|---|---|
| 2,741,307 | 4/1956 | Meserve et al. | 157/13 |
| 2,986,204 | 5/1961 | Wilson et al. | 157/13 |
| 3,618,654 | 11/1971 | Meserve | 157/13 |
| 3,645,304 | 2/1972 | Thrasher | 83/508.3 |
| 3,648,752 | 3/1972 | Benson | 157/13 |
| 3,763,914 | 10/1973 | Vance | 157/13 |
| 4,287,648 | 9/1981 | Hineborg et al. | 157/13 |
| 4,682,522 | 7/1987 | Barclay | 83/508.3 |
| 4,902,313 | 2/1990 | Penter | 157/13 |

FOREIGN PATENT DOCUMENTS

361790 8/1980 Austria .

Primary Examiner—John Zimmerman
Attorney, Agent, or Firm—Fleit, Jacobson, Cohn, Price, Holman & Stern

[57] ABSTRACT

A spacer is provided for an essentially cylindrical tool on whose circumference arc-shaped blades are mounted with spacers between them by means of bolts extending in the axial direction through the spacers. The spacer is made of steel sheet and has tangs bent out of the plane of the sheet. The tangs determine the distance between neighboring blades and are disposed on the inside edge and outside edge of the spacer oriented in the circumferential direction of the tool and the spacer. The tangs situated side by side in the circumferential direction have spaces between them in order to make a simple adaption to different distances between neighboring blades possible while simultaneously improving the removal of heat.

8 Claims, 2 Drawing Sheets

SPACER FOR AN ESSENTIALLY CYLINDRICAL TOOL AND PROCESS FOR ITS PRODUCTION

BACKGROUND OF THE INVENTION

The invention concerns a spacing piece for an essentially cylindrical tool on whose circumference blades with the shape of segments of arc are affixed with spacers between them by means of bolts extending in the axial direction through the spacers, the spacers consisting of steel sheet and displaying tangs, which determine the distance between neighboring blades, that are bent out of the plane, as well as a process for the production of such a spacer in which stampings are performed on a sheet metal blank corresponding to the desired height of the tangs and the tangs are bent out of the plane of the sheet metal blank preferably at an angle of 90°, and perforations are stamped out for the connecting bolts.

In spacing pieces according to the state of the art, especially spacing pieces according to Austrian patent [AT] 327 711 or AT 361 790, the primary objective is to improve the air circulation between the arc-segment-shaped tools arranged neighboring one another in the axial direction. The design according to AT 361 790 has the simultaneous objective of reducing the weight of the spacer, while the design according to AT 361 790 discloses essentially radial channels through which air can circulate. A disadvantage of this known design according to AT 361 790 is the fact that the perforation from which the tangs extending in the radial directions are bent out limit the free space for the arrangement of perforations for receiving the connecting bolts for the blades and that therefore with regard to the necessary stability of the spacer the tool cannot subsequently be adjusted to different blades with different hole distances for receiving connecting bolts. For different blades, besides a full distance that is optional within broad limits for receiving the mounting bolts, frequently a different distance must be maintained for neighboring blades, and in the case of the spacers known from AP 361 790, in such a case the entire manufacturing tool, especially the stamping tool as well as the bending tool must be modified in order to be able to produce spacers with different heights and therefore different distances between neighboring blades. For the production of such spacers, therefore, a significantly greater cost is sustained if different heights and different hole distances are to be achieved for mounting the blades. It has also been found that as a result of the increase in the air circulation a satisfactory cooling cannot be assured directly on the most strongly thermally stressed regions of the blades. The blades dipping into the material, e.g. a tire being prepared for retreading, are most strongly thermally loaded on their cutting edges, and the service life of such blades can then be effectively lengthened if the heat produced at this place can be carried off as close to the cutting edge as possible.

SUMMARY OF THE INVENTION

The invention thus aims at creating a spacing piece of the type mentioned initially which can be adapted at the lowest possible engineering cost to different distances of neighboring blades or different hole spacings for receiving connecting bolts and which simultaneously causes an improved removal of heat near the cutting edges of the blades. The invention also has the objective of assuring a high degree of stability without the risk of occurrence of vibrations even at different hole distances for the connecting bolts for attaching the blades. To solve this problem, the design according to the invention involves primarily designing the tangs as tangs arranged on the inside edge and the outside edge of the spacer and oriented in the circumferential direction of the tool and the spacer, the tangs lying side by side in the circumferential direction and arranged with a free space between them. Due to the fact that the tangs are bent on the periphery on the inner edge and outer edge of the spacer whose free ends run essentially in the circumferential direction, after bending, a design is created in which the central part displaying holes for inserting attachment bolts is kept free of other perforations than such receiving holes so that a greater freedom is created for adaptation to blades with different hole spacing for the attachment bolts. At the same time these curved tangs running in the circumferential direction permit a distinctly improved removal of heat near the cutting edges, because the tools are in touching contact with the free ends of the bent tangs running in the circumferential direction, and the heat can be dissipated via thermal conduction. The thermal conductivity of metal is much greater than that of air, and even circulating air could not provide better heat removal than such a direct contact between metal surfaces. As a result of the bent tangs running in the circumferential direction, in addition, the possibility is created of producing differing spacing pieces by making cuts of different depths in the radial direction without changing the bending tool, thus making different distances between neighboring blades possible. In operation, moreover, it has been found that such rotating cylindrical tools, especially when used for the preparation of tires for retreading, do not necessarily dip into the material only with their blades. In the case of spacer designs with cross bars running essentially radially, in solitary cases it has been observed that these radially running cross members also dip into the material and that such radially running cross members are therefore at risk of breaking.

The design according to the invention is such that the sum of the free edge lengths of the curved tangs corresponds to at least ⅓, preferably at least ½ of the edge length of the spacer measured in the circumferential direction. In this way an efficient temperature removal is assured in the immediate vicinity of the outer edge of the blade.

An especially high stability of the spacer, which is otherwise of very light design, can be achieved by forming the end of the spacer, when viewed from the top in the circumferential direction, with a conical taper and by connecting the bent tangs in the region of the conical tapering ends.

In order to create an additional cooling, besides the direction conduction of the thermal energy by contact with the end edges of the bent tangs and to reduce the risk of an impermissibly high accumulation of cuttings in the region of the spacer, the design is advantageously such that the tangs lying one behind the other in the radial direction are arranged at least partially staggered.

To assure high stability without the risk of occurrence of vibrations in operation even in the case of short distances or a large number of perforations necessary for the connecting bolts, the design is advantageously such that the edges of the perforations for receiving the connecting bolts are deformed to form a sleeve. The deformation of the edges in this case can be accomplished by upsetting, deep drawing or flanging, and such a design simultaneously leads to an increase in operating time of the tool, because notch stresses on the connecting bolts in the region of the perforations of the spacers are avoided.

The process according to the invention for the production of such a spacer whereby stampings are produced on a cut sheet metal blank in accordance with the desired height of the tangs, and the tangs are bent out of the plane of the workpiece preferably at an angle of 90° and in which perforations are stamped out for the connecting bolts, is essentially characterized by the fact that radial rectangular recesses are stamped out on the edges of the sheet metal blank, running in the circumferential direction, whose depth in the radial direction is chosen in accordance with the desired height of the tangs and by the fact that the tangs remaining beside the recesses are bent away, whereupon, if necessary after the stamping process, the edges of the perforations for the connecting bolts are cold deformed, especially deep drawn. Such a process has the advantage over the conventional spacer fabrication process that, by a simple repositioning of the stamping tool, spacers of different height can be produced without a significant modification of the bending tool. A change in the height of the spacer in this case has no effect on the remaining free area for the arrangement of perforations for the attachment bolts extending in the axial direction such as are necessary for the assembly of the essentially cylindrical tool with the blades shaped as segments of arc. In principle, a variable height of the spacer can be achieved by the fact that, on the one hand, all tangs are bent away toward the same side of the sheet metal workpiece, and in order to increase the height of such tangs they are alternately bent to both sides of the main body. Bending to both sides of the main body can be accomplished with the same bending tool directly. If, for this purpose, the sheet metal workpiece is inserted alternately in different positions in the bending tool. To achieve an especially high stability, the process can be carried out by bending all tangs toward the same side of the sheet metal blank. In order to achieve the advantageous design of the edges of the perforations for increasing stability, in this case one proceeds by cold deforming the edges of the perforations for the connecting bolts after they are stamped out, especially by deep drawing. The sleeve-like design of the hole edges achieved in this way simultaneously reduces the notch stress on the connecting bolts in operation and thus contributes to increasing the service life of the tool.

BRIEF DESCRIPTION OF DRAWINGS

The invention is illustrated in detail in the following with reference to a schematically illustrated example. In it.

DESCRIPTION OF PREFERRED EMBODIMENTS

Figure 1:
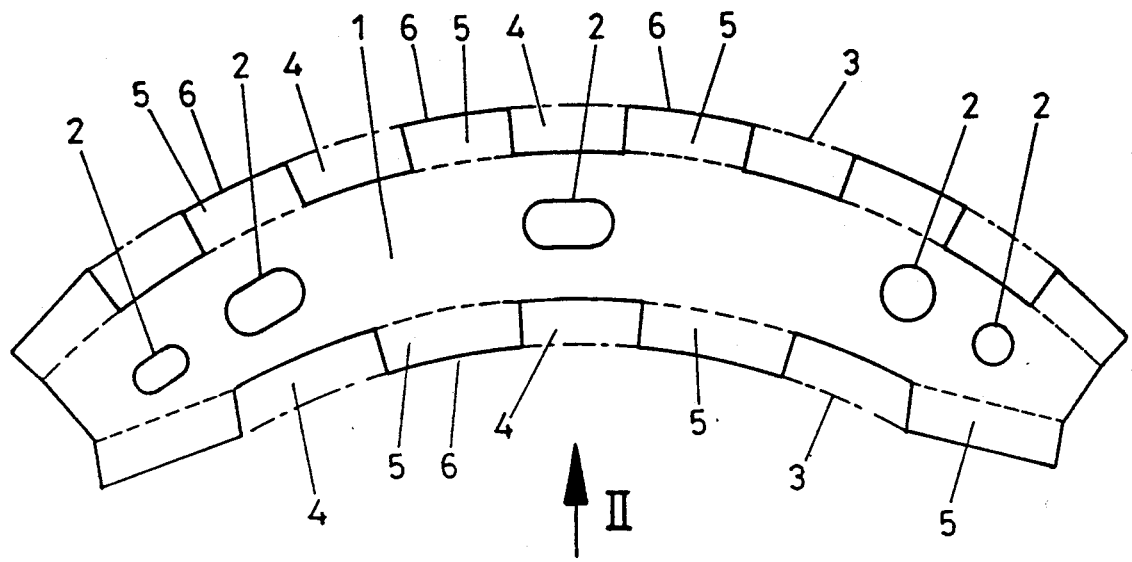
FIG. 1 is a top view of a sheet metal blank for the production of a spacer according to the invention.

In FIG. 1, the main body of the spacer is denoted by 1. On this main body, at various distances, perforations 2 are provided for holding the connecting bolts for the mounting of blades of essentially arc-segment shape, which are not shown in the drawing.

On the circumferential edges of such a sheet metal blank, as indicated by 3, essentially radial notches or cut-outs 4 are made, the tangs remaining between the cut outs. By bending these tangs 5 out of the plane of the sheet metal blank 1 a free edge 6 is formed on said tangs 5 running essentially in the circumferential direction which, upon the assembly of the tool, come into end contact with neighboring tools with the blades held fast by the bolts, not shown, passing through the perforations 2. The heat produced during the cutting process with the arc shaped blades is carried off by these free edges 6 after the assembly.

The edges for contacting the neighboring arc-shaped blades are clearly shown in FIG. 2 and again denoted by 6. As FIG. 2 shows, the tangs lying one behind the other in the radial direction are arranged at least partial staggered.

As FIG. 1 shows in particular, the free ends of the metal blank 1 are so designed that they taper at their periphery. After the terminal tangs 5 are bent away, as a result of this, a significant increase in stability is achieved while the weight remains low. This is advantageous especially with regard to the rigid connection of neighboring blades with each other in the region of the end perforations 2.

Figure 2:
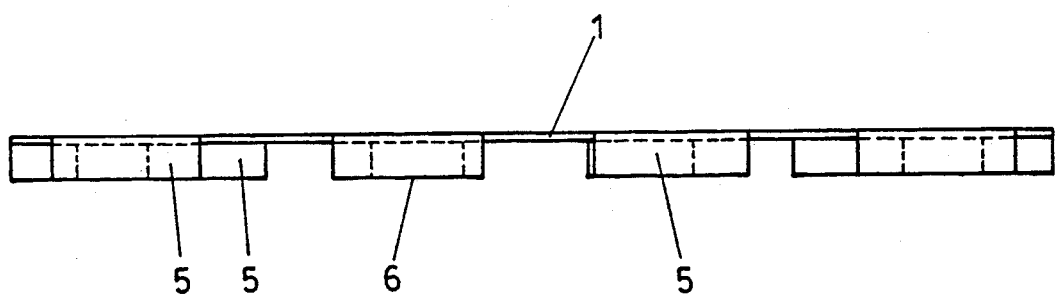
FIG. 2 shows a view in the direction of arrow II on a spacer after the tangs are bent.
Figure 3:
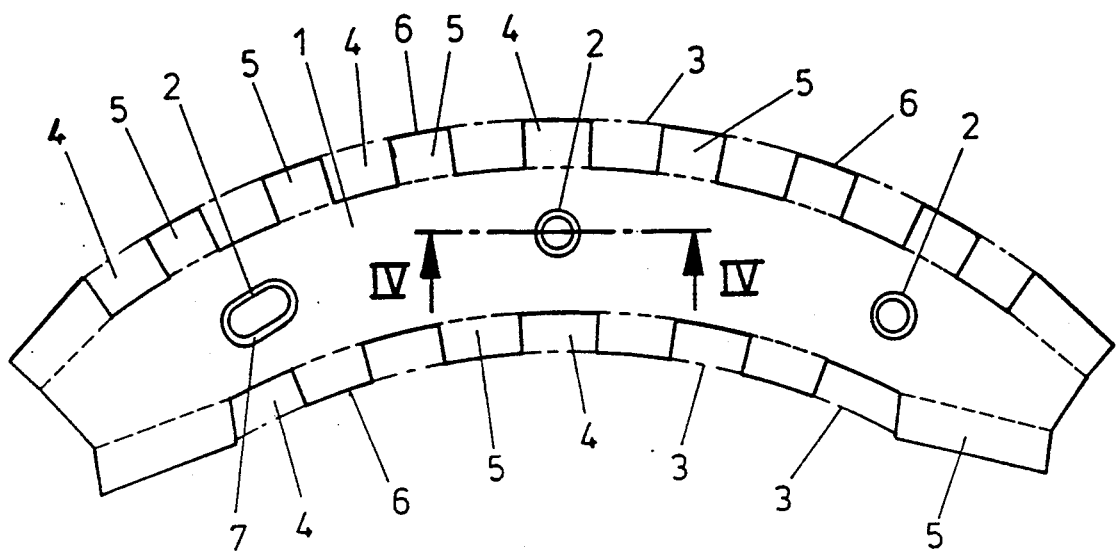
FIG. 3 shows a top view of a modified version of a sheet metal blank for the spacer according to the invention, and FIG. 4 a partial section along line IV—IV in FIG. 3 of the spacer after the tangs are bent.
Figure 4:
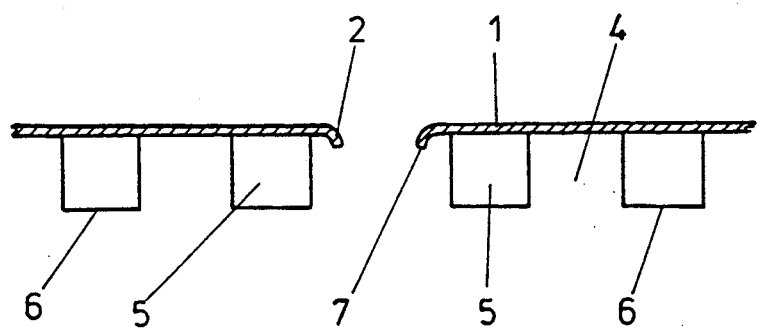

In the design shown in FIGS. 3 and 4 the reference numbers of FIGS. 1 and 2 are maintained. In this case to improve the stability of the spacer in operation the edges 7 of the perforations 2 for receiving the connecting bolts for fixation of the essentially arc-shaped blades are deformed to a form a sleeve, as is clearly apparent especially in FIG. 4. The deformation of edges 7 can be accomplished by deep drawing, upsetting or flanging. Besides increasing the stability of the cut sheet metal blank, the sleeve-like perforations 2 also protect the connecting bolts by essentially avoiding notch stresses.

I claim:

1. A spacer for use between arcuate-shaped blades of a tool, said spacer comprising an arcuate-shaped substantially planar steel sheet with radially inner and outer edges, spacing tangs integral with said sheet extending along said inner and outer edges, the tangs extending at an angle to said sheet and having spaces therebetween, and apertures in the sheet for receiving bolts to attach the spacer to a tool.

2. A spacer as claimed in claim 1 wherein the tangs extend over at least ⅛ to at least ¼ of the circumference of the sheet.

3. A spacer as claimed in claim 1 wherein the sheet has tapered end portions and the tangs extend along said end portions.

4. A spacer as claimed in claim 1 wherein the tangs on the inner edge are staggered in relation to the tangs on the outer edge.

5. A spacer as claimed in claim 1 wherein said apertures have edges deformed out of the plane of the sheet.

6. A method of making a spacer for use between arcuate-shaped blades of a tool comprising providing a generally arcuate and planar steel sheet having radially inner and outer edge portions, forming a series of peripherally spaced cut-outs in each of said edge portions to define spacing tangs therebetween, bending the tangs out of the plane of the sheet and forming apertures in the sheet to receive attachment bolts.

7. A method as claimed in claim 6 wherein the tangs are bent to an angle of about of 90 degrees to the plane of the sheet.

8. A method as claimed in claim 5 including the step of deforming edges of said apertures out of the plane of the sheet.

* * * * *